Sept. 8, 1925. 1,553,239

E. HAUSER

HAND CAR

Filed July 14, 1924 2 Sheets-Sheet 1

Edward Hauser
INVENTOR

BY *Victor J. Evans*
ATTORNEY

Sept. 8, 1925.                                                        1,553,239
E. HAUSER
HAND CAR
Filed July 14, 1924                         2 Sheets-Sheet 2
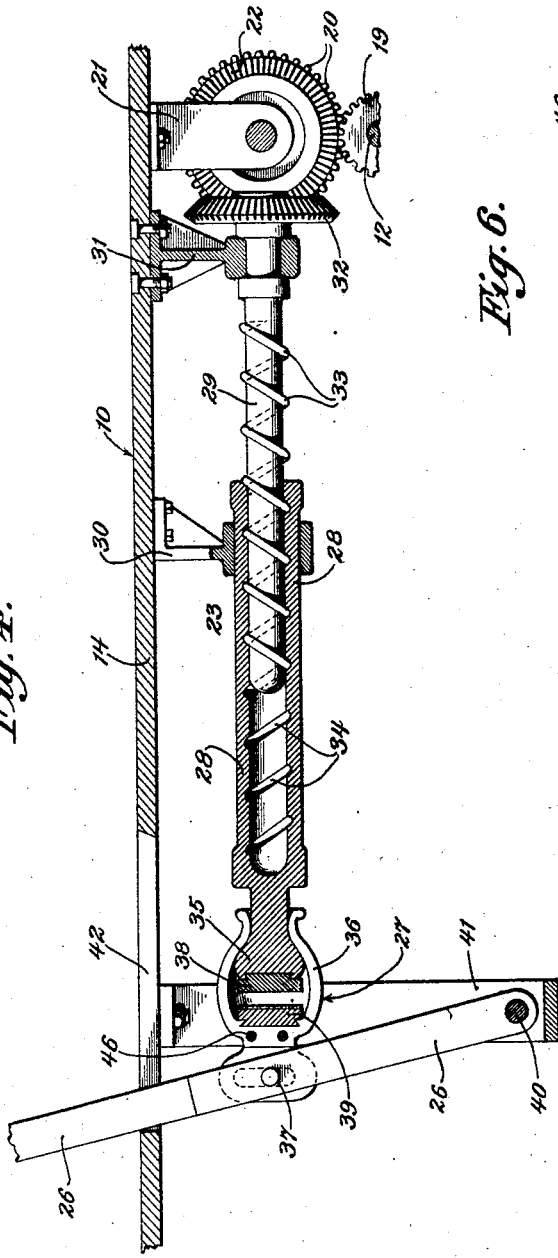
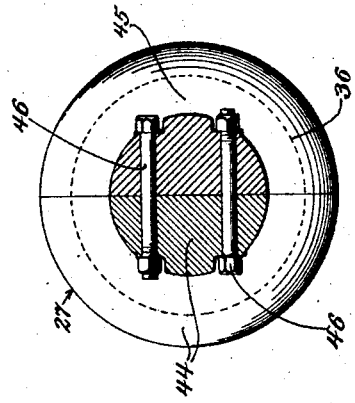
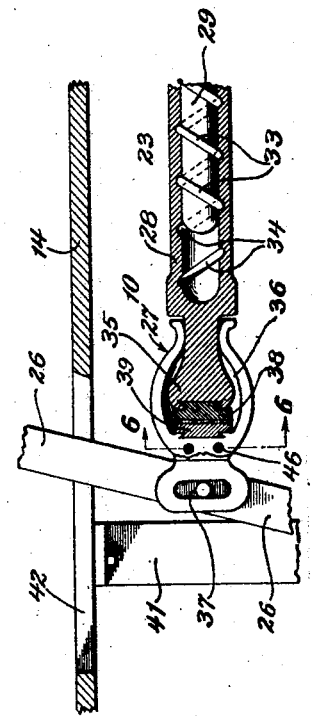
Edward Hauser
INVENTOR Patented Sept. 8, 1925.

1,553,239

UNITED STATES PATENT OFFICE.

EDWARD HAUSER, OF WOODHAVEN, NEW YORK.

HAND CAR.

Application filed July 14, 1924. Serial No. 726,052.

*To all whom it may concern:*

Be it known that I, EDWARD HAUSER, a citizen of the United States, residing at Woodhaven, in the county of Queens and State of New York, have invented new and useful Improvements in Hand Cars, of which the following is a specification.

This invention relates to improvements in hand cars and has for its primary object, the provision of a self-propelled vehicle having a pair of levers operable by a rowing motion, that is, both levers being movable simultaneously in the same direction, or in the event this particular movement should become tiresome to the operator, the levers are capable of simultaneous movement in opposite directions.

Another object of the invention resides in the provision of a hand car which is provided with a novel form of driving means, which assures a maximum amount of driving power with a minimum effort on the part of the operator.

A further object of the invention is to provide a hand car for children which is simple in construction, cheap of manufacture and easy of operation.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 4 is an enlarged vertical longitudinal sectional view through the driving means.

Figure 5 is a detail vertical sectional view showing the position of the parts when the clutch is engaged.

Figure 6 is a vertical sectional view on the line 6—6 of Figure 5.

Figure 1:
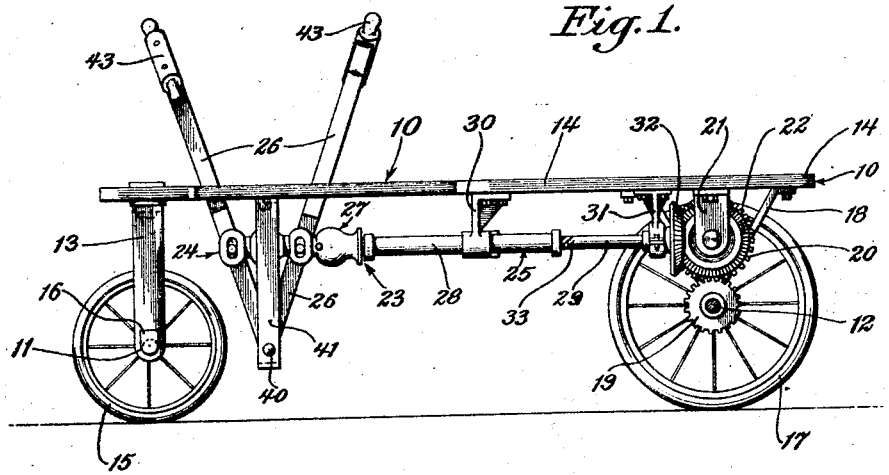
Figure 1 is a side elevation of my improved hand car.
Figure 2:
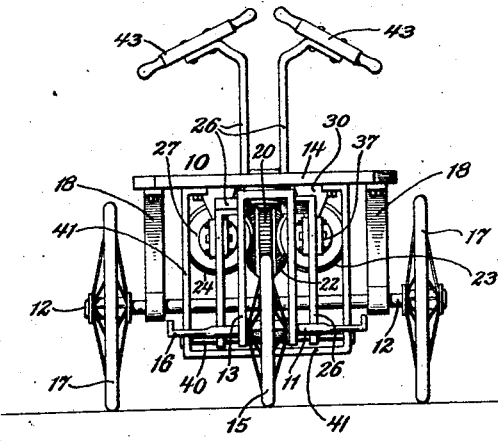
Figure 2 is a front view thereof.
Figure 3:
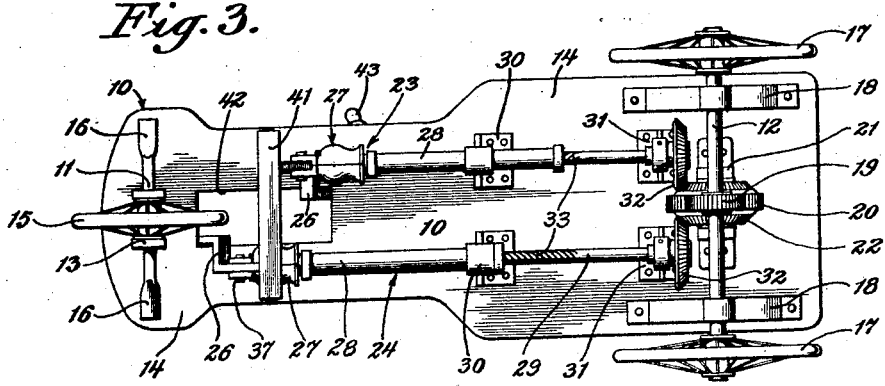
Figure 3 is a top plan view.

Referring more particularly to the drawing, the reference numeral 10 designates my improved hand car in its entirety, and which includes front and rear axles 11 and 12 respectively. The front axle 11 is journaled in a fork 13, and which fork is movably mounted at the forward end of a platform or seat 14. A single wheel 15 is mounted upon the axle 11 between the arms of the fork and serves as a guiding or steering wheel operable by the feet of the operator which are placed upon the portions 16 of the axle 11 which extend beyond the opposite sides of the wheel 15. Driven wheels 17 are keyed to the axle 12 and brackets 18 support the rear of the platform from the axle. A relatively small driven gear 19 is keyed to the axle 12 centrally between the wheels 17 and meshes with a relatively larger drive gear 20 journaled in brackets 21 depending from the platform 14. The driven gear 20 has its opposite sides provided with beveled gear teeth 22 for a purpose to be presently described.

For imparting power to the axle, I provide operating means 23 and 24 which co-act respectively with the beveled gear teeth 22 on the opposite sides of the drive gear, and which means are identical in construction so that a description of one will suffice for the other. Each of the driving means includes a drive shaft 25, a hand operated lever 26 and a clutch mechanism 27 connecting the drive shaft with the hand operated lever. The drive shaft 25 comprises a sliding non-rotatable sleeve 28 and a rotatable shaft 29, which is supported beneath the platform 14 by brackets 30 and 31 respectively. The shaft 29 has its free end provided with a beveled gear 32 for mesh with the beveled teeth on the side of the drive gear for imparting motion from the drive shaft to the wheels to be driven. The free end of the shaft 29 is provided with threads 33 which co-act with the internal thread 34 formed in the sleeve 28. The end of the sleeve 28 is formed with a spherical head 35 which is swivelly mounted in a socket 36 and which socket is attached to the lever 26 by means of a pin and slot connection 37. The head 35 and the socket 36 constitute part of the clutch mechanism 27 which comprises a disk of relatively soft rubber 38 carried by the head 35 and a disk of rubber 39 carried at the rear of the socket which is slightly harder than the rubber 38, which disks are adapted to be brought into contact with each other when the lever is moved rearwardly in order to set-up a friction sufficient to slide the sleeve 28 over the shaft 29 without rotating whereby to cause the threads 34 of the sleeve to co-act with the threads 33 on the shaft to impart rotary movement to the gear 32. Wherein it has been stated that the sleeve 28 is non-rotatable, this is only so upon the rearward movement of the lever but upon forward movement of the lever, the disks 38 and 39 will separate and as the sleeve moves forward, the threads on the shaft will cause said sleeve to turn as will be readily appreciated. The handle 26 is fulcrumed as at 40 to a bracket 41 depending from the platform 14 and the said lever extends through a slot 42 in the platform, the ends of the slot serving to limit the stroke of the levers in either direction. The levers are provided at their upper ends with handles 43 but which handles may be in the form of oars if desired so as to give the device the appearance of a boat.

From the foregoing description, it will be seen that the levers 26 may be moved simultaneously in the same direction to cause the gears 32 to act simultaneously upon the gear 20, or the levers may be moved simultaneously in opposite directions so that one of the gears 32 is driving the gear 20 while the other gear is idle due to the forward movement of one of the levers.

In order that the disks 38 and 39 may be replaced after having become worn, I construct the socket 36 of two sections 44 and 45 which are bolted together as at 46.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. In a hand car, the combination with the forward and rear axles and carrying wheels therefor, of a platform mounted above said axles, a driven gear keyed to the rear axle, a drive gear in mesh with said driven gear, a pair of hand operated levers, driving means for each of said levers for imparting movement to said drive gear, and clutch means between said levers and said driving means, said levers being capable of operation simultaneously in the same direction or simultaneously in opposite direction for actuating the respective driving means.

2. In a hand car, the combination with the forward and rear axles, and carrying wheels therefor, of a platform mounted above said axles, a driven gear keyed to the rear axle, a drive gear in mesh with said driven gear, a pair of hand operated levers, driving means for each of said levers for imparting movement to said drive gear, and clutch means between said levers and said driving means, said levers being capable of operation simultaneously, or independently, for actuating the respective driving means.

3. In a hand car, the combination with the forward and rear axles and carrying wheels therefor, of a platform mounted above said axles, a driven gear keyed to the rear axle, a drive gear in mesh with said driven gear, a pair of operating levers, driving means for each of said levers for imparting movement to said drive gear, each of said driving means including a non-slidable rotatable part and a co-acting part slidable in one direction and rotatable in the opposite direction, a gear carried by the free end of each non-slidable rotatable part for mesh with said drive gear, and the free end of said sliding part swivelly connected to its respective lever.

4. In a hand car, the combination with the forward and rear axles and carrying wheels therefor, of a platform mounted above said wheels, a driven gear keyed to said rear axle, a drive gear in mesh with said driven gear, means for imparting movement to said drive gear, said means including a pair of co-acting parts constituting a drive shaft, a gear carried by the end of one of said parts for mesh with said drive gear, an operating lever, and a swivel connection between said other part and said lever.

5. In a hand car, the combination with the forward and rear axles and carrying wheels therefor, of a platform mounted above said wheels, a driven gear keyed to said rear axle, a drive gear in mesh with said driven gear, means for imparting movement to said drive gear, said means including a pair of co-acting parts constituting a drive shaft, a gear carried by the end of one of said parts for mesh with said drive gear, an operating lever, and a swivel connection between said other part and said lever, and a clutch means between said lever and said last part operable upon the forward movement of said lever.

6. In a hand car, the combination with the forward and rear axles and carrying wheels therefor, of a platform mounted above said wheels, a driven gear keyed to said rear axle, a drive gear in mesh with said driven gear, means for imparting movement to said drive gear, said means including a rotatable shaft having a gear thereon at one end for mesh with a bevel gear surface on the side of said drive gear, a sleeve for receiving the other end of said shaft, co-acting means on said sleeve and shaft, and operating means for sliding said sleeve over said shaft to cause said co-acting means to impart rotary movement to said shaft.

7. In a hand car, the combination with the forward and rear axles and carrying wheels therefor, of a platform mounted above said wheels, a driven gear keyed to said rear axle, a drive gear in mesh with said driven gear, means for imparting movement to said drive gear, said means including a rotatable shaft having a gear thereon at one end for mesh with a bevel gear surface on the side of said drive gear, a sleeve for receiving the other end of said shaft, co-acting means on said sleeve and shaft, a lever, clutch means for sliding said sleeve over said shaft to cause the co-acting means to impart rotary movement to said shaft on movement of the lever in one direction.

8. In a hand car, the combination with the forward and rear axles and carrying wheels therefor, of a platform mounted above said wheels, a driven gear keyed to said rear axle, a drive gear in mesh with said driven gear, means for imparting movement to said drive gear, said means including a rotatable shaft having a gear thereon at one end for mesh with a bevel gear surface on the side of said drive gear, a sleeve for receiving the other end of said shaft, co-acting means on said sleeve and shaft, a lever, clutch means for sliding said sleeve over said shaft to cause the co-acting means to impart rotary movement to said shaft on movement of the lever in one direction, and a swivel means for permitting the rotation of said sleeve with respect to said shaft upon the movement of said lever in an opposite direction.

In testimony whereof I have affixed my signature.

EDWARD HAUSER.